United States Patent [19]

Andersen

[11] Patent Number: 4,890,645

[45] Date of Patent: Jan. 2, 1990

[54] ROTARY SHEAR SEAL HYDRAULIC VALVE

[75] Inventor: Roger K. Andersen, Anaheim Hills, Calif.

[73] Assignee: Baroid Technology, Inc., Houston, Tex.

[21] Appl. No.: 333,873

[22] Filed: Apr. 3, 1989

Related U.S. Application Data

[63] Continuation of Ser. No. 106,633, Oct. 8, 1987, abandoned.

[51] Int. Cl.$^4$ ............................................. F15B 13/042
[52] U.S. Cl. ........................... 137/625.66; 137/625.21; 251/31; 251/58; 251/250
[58] Field of Search ....................... 137/625.21, 625.66; 251/58, 250, 31

[56] References Cited

U.S. PATENT DOCUMENTS

| | | | |
|---|---|---|---|
| 2,653,003 | 9/1953 | Overbeke | 137/625.21 |
| 3,556,151 | 1/1971 | Masuda | 137/625.27 |
| 3,796,232 | 3/1974 | Dalton | 137/625.21 |
| 4,467,833 | 8/1984 | Satterwhite et al. | 251/31 X |
| 4,681,133 | 7/1987 | Weston | 251/58 X |
| 4,700,924 | 10/1987 | Nelson et al. | 251/58 |

FOREIGN PATENT DOCUMENTS 10131  1/1980  Japan ............................. 137/625.21

Primary Examiner—Gerald A. Michalsky
Attorney, Agent, or Firm—Browning, Bushman, Zamecki & Anderson

[57] ABSTRACT

A rotary shear seal hydraulic valve which can be used in three- and four-way embodiments is formed by a housing and a body together defining therebetween a generally cylindrical stepped cavity in which a rotor is rotatably positioned. The housing contains at least two shear seal valve assemblies positioned to be aligned with ports in the rotor to establish communication between the shear seal means. The body contains at least one piston member including a rack portion engaging a profiled pinion portion of the rotor to effect the rotational drive of the rotor. The pistons can be driven in both directions by fluid means or in one direction by spring return means. The pistons can also be actuated by solenoid means and the positioning of the rotor can be strained by a lever providing a manual override. By selectively plugging the various ports, the four-way valve can be utilized in a three-way configuration, thereby providing a great degree of flexibility.

9 Claims, 9 Drawing Sheets

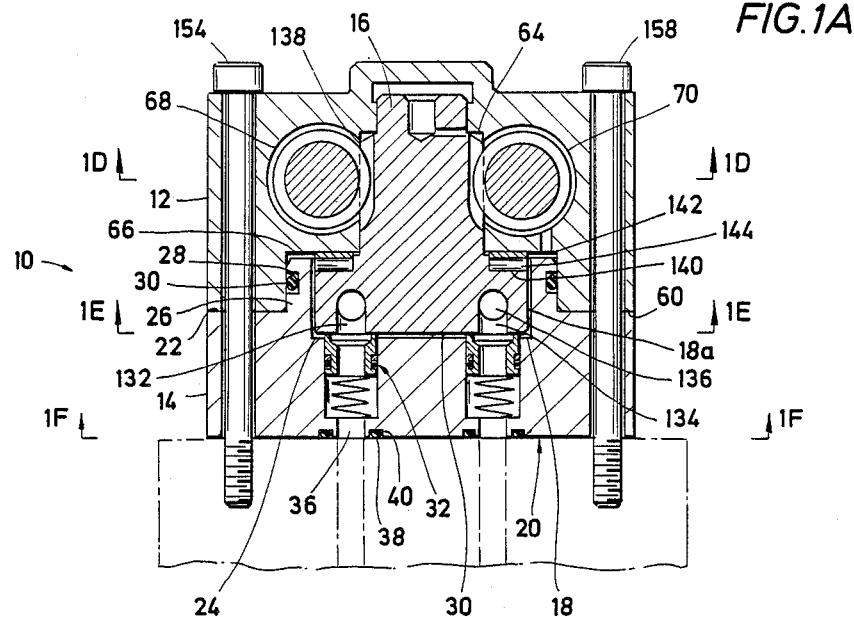
FIG.1A
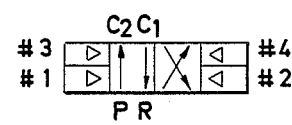
FIG.1B
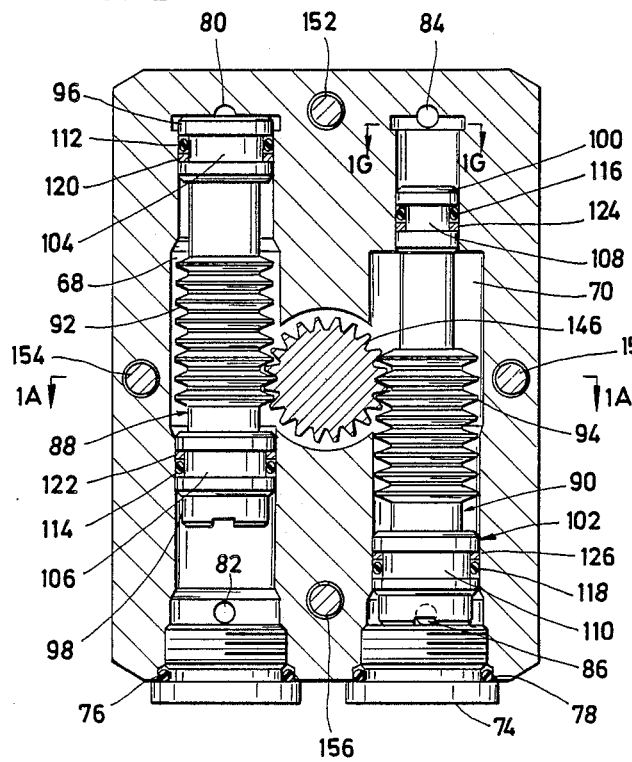
FIG.1D
FIG.1C

FIG.4A 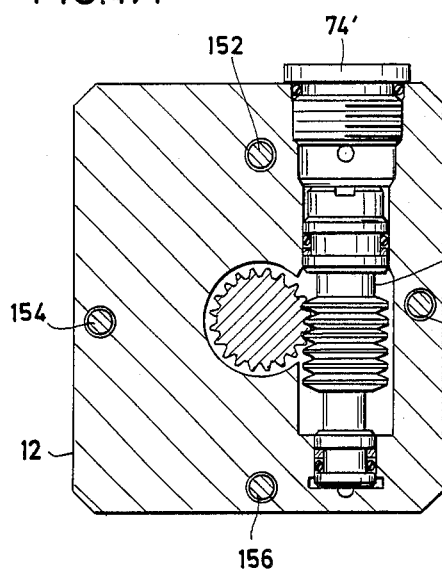 FIG.5A 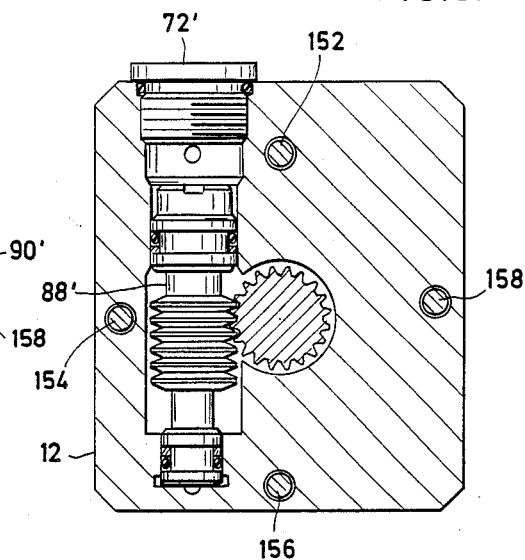
FIG.4B 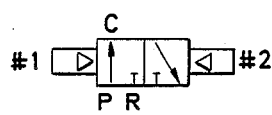 FIG.5B 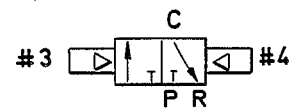
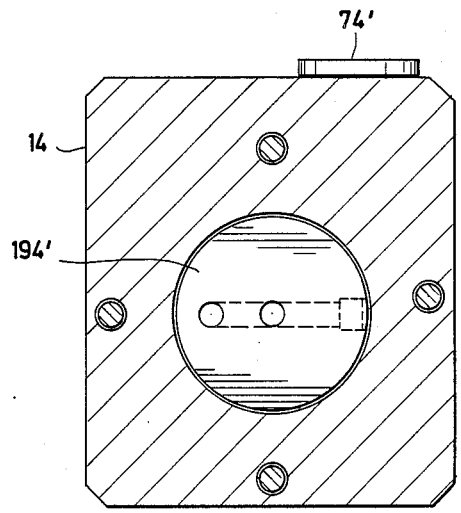 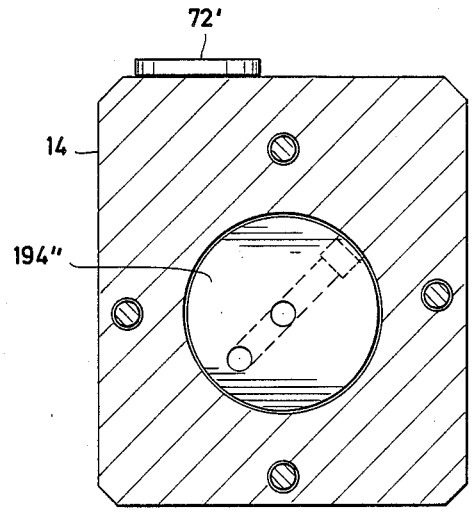
FIG.4C FIG.5C

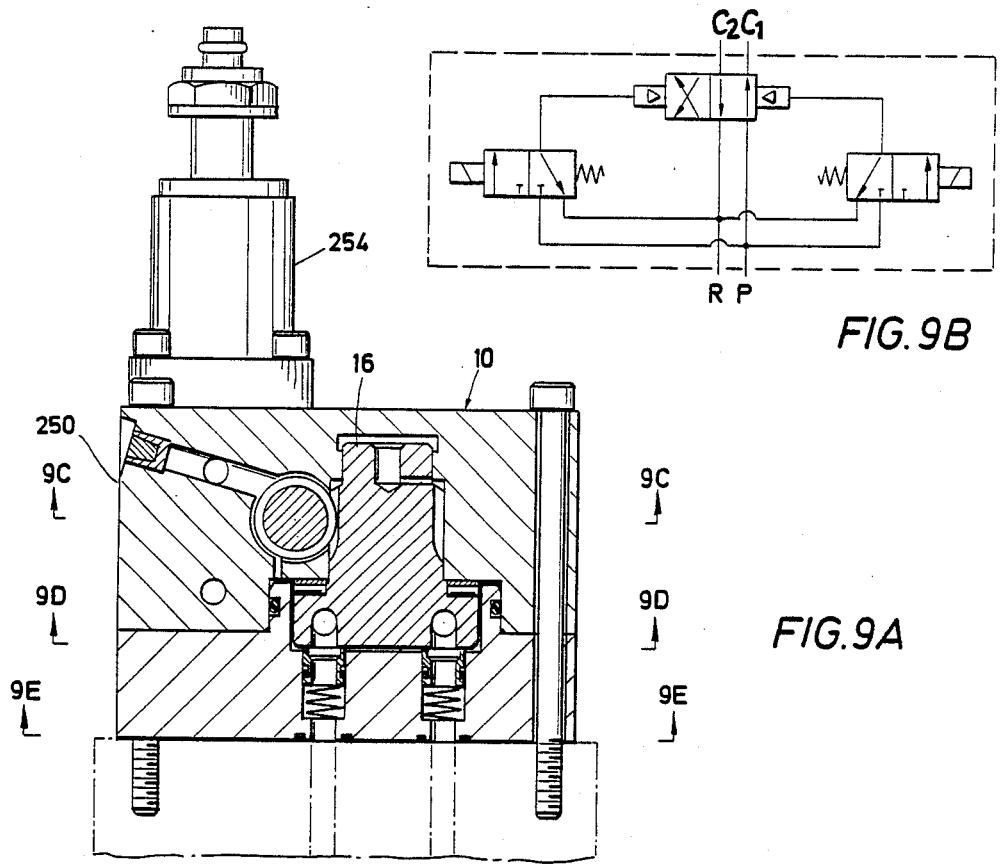
FIG.9B
FIG.9A
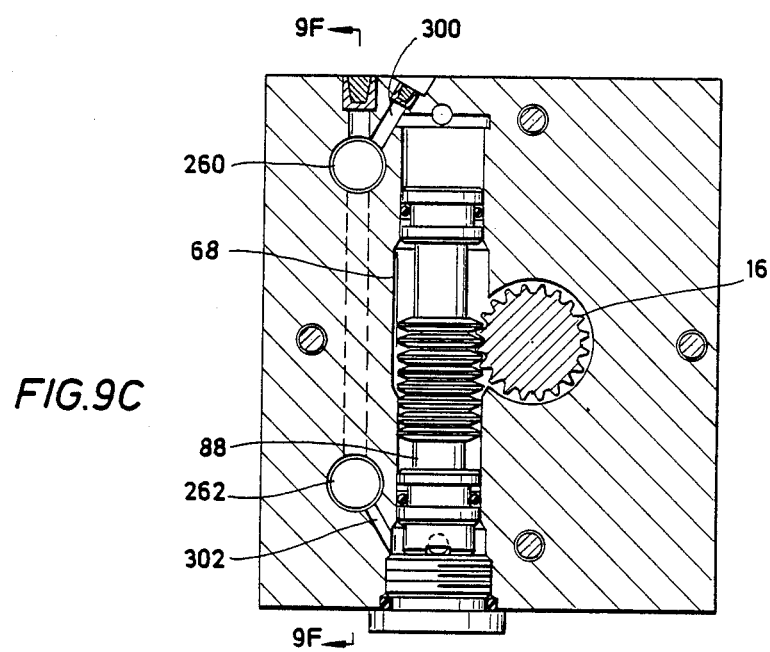
FIG.9C

ROTARY SHEAR SEAL HYDRAULIC VALVE

This is a continuation of Ser. No. 106,633, filed Oct. 8, 1987, now abandoned.

BACKGROUND OF THE INVENTION

1. Field of the Invention

The present invention relates to an improved rotary shear seal hydraulic valve and, in particular, to a valve which can be made in many different configurations.

2. Description of the Background

The present invention is directed to a number of various improvements in rotary shear valve systems which improvements allow for a limited number of parts to be utilized to form a number of different valve configurations.

The subject valve has only four basic components, each of which can have a limited number of variations. With this relatively small inventory of parts, a large number of three-way and four-way valve embodiments can be made. Thus, part storage and valve assembly can be greatly simplified. This is particularly advantageous in on-site situations where parts and storage are limited and the need for rapid and versatile valve assembly and repair are great.

The subject valve is primarily useful in quadrapilot (four different pilot) controls and can provide at least five different shifting pressures in three- and four-way flow patterns. The subject valve can be manually operated with hydraulic or pneumatic override in either the three- or four-way flow patterns. It is also possible to operate the present invention with solenoid pilot valves or with hydraulic pilot operator and spring returns. The present invention finds particular application for use in systems such as that described in U.S. Pat. No. 4,467,833, the disclosure of which is incorporated herein by reference.

The previous valves of this general nature were linear in operation. The present invention is rotary which yields a number of advantages including enabling the valve to accept high return pressures.

SUMMARY OF THE INVENTION

The present invention is a rotary shear seal hydraulic valve having a valve housing and valve body which together define therebetween a generally cylindrical cavity having a stepped profile. The valve body contains at least one passage intersecting the cavity along a chord thereof with a port opening to each end of each at least one passage. The valve housing has at least two bores intersecting the cavity parallel to the axis thereof with at least one of the bores situated on a curve concentric with the cavity axis. A profiled rotor is received in the cavity with a rotor having an axial face containing at least two ports with conduits within the rotor connecting the ports in pairs. The ports are spaced to align with the bores in the valve housing upon proper rotational positioning of the rotor. The rotor is also profiled to have a portion defining a pinion gear. A piston is mounted in each of the at least one passages in the valve body with each piston having a portion defining a rack gear engaging the pinion portion of the rotor so that as the piston moves in a reciprocal fashion, the rotor is driven in a rotary fashion. A shear seal assembly is located in each of the bores in the housing with each assembly including an annular seal body mounted for reciprocal movement in the bore and biased by a spring into engagement with the axial face of the rotor. An annular seal forms a wiping seal between the seal body and the bore walls.

BRIEF DESCRIPTION OF THE DRAWINGS

The present invention will now be described by way of example with reference to the accompanying drawings, in which:

FIG. 1A is a section through a quadropilot four-way rotary shear seal hydraulic valve according to the present invention and taken along line 1A—1A of FIG. 1D:

FIG. 1B is a schematic representation of this embodiment of the subject valve;

FIG. 1C is an enlarged detail of a shear seal of FIG. 1A;

FIG. 1D is a section taken along line 1D—1D of FIG. 1A;

FIG. 4A is a section, similar to FIG. 1D, showing a normally open three-way rotary shear seal hydraulic valve embodiment of the present invention;

FIG. 4B is a schematic representation of this fourth embodiment;

FIG. 4C is a section, similar to FIG. 1E, showing the fourth embodiment of the present invention;

FIG. 5A is a section similar to FIG. 4A showing a normally closed three-way rotary shear seal hydraulic valve embodiment of the present invention:

FIG. 5B is a schematic representation of this fifth embodiment of the present invention;

FIG. 5C is a section similar to FIG. 4C showing the fifth embodiment of the present invention;

FIG. 9A is a section through a solenoid piloted embodiment of a four-way rotary shear seal hydraulic valve according to the present invention;

FIG. 9B is a schematic representation of this ninth embodiment:

FIG. 9C is a section taken along line 9C—9C of FIG. 9A;

DETAILED DESCRIPTION OF THE PREFERRED EMBODIMENTS

Figure 1E:
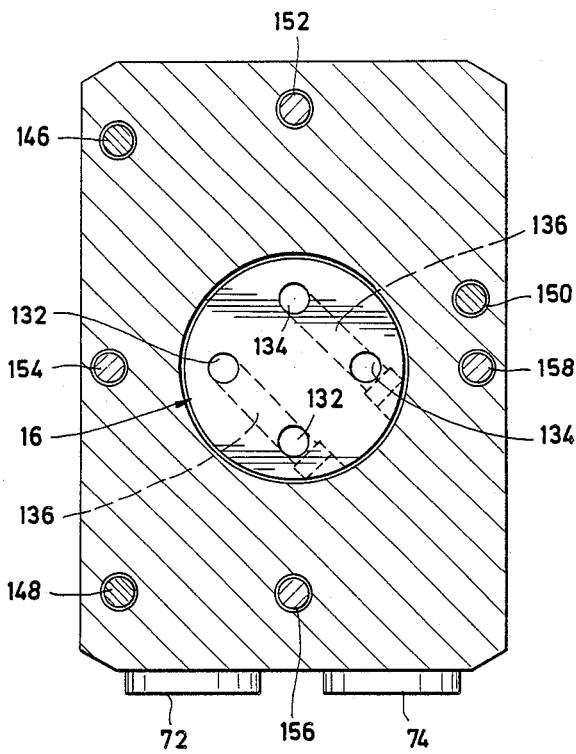
FIG. 1E is a section taken along line 1E—1E of FIG. 1A.

FIGS. 1A-1H show a four-way rotary shear seal hydraulic valve embodiment of the present invention and include the details that are used throughout all of the alternate embodiments. Thus, details not described with reference to an alternate embodiment should be referred back to this primary embodiment for a full description. This four-way embodiment can also be considered as the preferred embodiment since it can function as a three-way valve by selective plugging of the various ports.

The four-way rotary shear seal hydraulic valve 10 shown in FIGS. 1A-1H is formed by a valve body 12, a housing 14 and a rotor 16 received in a cavity 18 defined between the housing 14 and body 12. The housing 14 is a generally rectangular member having a forwardly directed mounting face 20 and a rearwardly directed mating face 22. An annular recess 24 is formed in face 22 and is surrounded by an annular peripheral flange 26. The recess 24 and flange 26 form a portion 18a of the cavity 18, this portion being of a larger first diameter. The flange 26 has an outwardly directed groove 28 in which an 0-ring 30 is seated. The housing 14 also includes at least two shear seal assemblies 32 each extending between the face 20 and the base of the recess 24. Each shear seal assembly is formed by a bore having a first bore portion 34 of a first large diameter and a second bore portion 36 of a second smaller diameter and opening on the face 20. An 0-ring 38 is received in an annular groove 40 concentric with the bore portion 36. The shear seal body 42 (see FIG. 1C) is an annular member having an outwardly directed groove 44 which receives therein an 0-ring 46 and a back-up ring 48. The body 42 has a machine lapped face 50 and a bore 52 opening on the face 50 and passing through the body 42. The bore 52 preferably has a truncated conical entry at the face 50. A spring 54 lies within the first bore portion 34 between the rear surface 56 of the seal body 42 and shoulder 58 formed between the first and second bore portions 34, 36. This spring 54, together with the piston action of fluid pressure acting on the rear surface 56 biases the seal body 42 outwardly of the bore portion 34.

The body 12 is also a generally rectangular member having an outer profile similar to that of the housing 14 and with a mating face 60 having a stepped recess formed therein by a first portion 62 opening directly on the face and having a first diameter and a second continuous portion 64 of a second smaller diameter forming a shoulder 66 therebetween. The first portion 62 is of sufficient diameter to receive flange 26 of body 12 therein. Portion 64 and shoulder 66 define the rear of cavity 18. In this embodiment, a pair of bores 68, 70 extend normal to and on either side of the axis of the portion 64, with both bores intersecting chords of the portion 64. Each bore 68, 70 is a blind bore closed on one end by plug 72, 74 respectively, each of which has an 0-ring 76, 78 forming a seal between the plug and the body. At each end of each bore there is a port 80, 82, 84, 86, best seen in FIG. 1D. Within each bore, there is a piston 88, 90 each piston having a central portion forming a rack gear 92, 94 and oppositely directed piston heads 96, 98, 100, 102. Each piston head is provided with an outwardly directed groove receiving therein an 0-ring 112, 114, 116, 118 and back-up ring 120, 122, 124, 126. The reason for the different size piston heads is to permit actuation of the valve by pressure differentials. For example, a bias or reference pressure is applied to port 84 to apply force against the smallest piston head 100. This will hold the valve in a preferred or normal position until pressure is introduced to one of the ports 80, 86, which pressure, in conjunction with the piston head area, is of sufficient force to overcome the bias of reference force causing the rotor to rotate to another position. This movement can result from any of a combination of forces being applied to the various piston heads. It will be noted that the pistons normally lie at opposite ends of their respective bores since their rack portions must act linearly in opposite directions in order to effect rotation of the rotor.

The rotor 16 is a solid generally cylindrical member having a first or front portion 128 of a first large diameter suitable to fit within the annular recess 24. This portion 128 has a front face 130 which contains therein at least two ports 132, 134 with the ports connected internally in pairs by conduits 136. The front portion 128 is integral with a coaxial rear portion 138 which is of a second smaller diameter with a shoulder 140 therebetween. A thrust race 142 is positioned on the shoulder 66 of the body 12 and a plurality of thrust needle bearings 144 lie between the thrust race 142 and shoulder 140. This bearing arrangement supports the rotor from the thrust load of the shear seal 42 and the internal pressure on face 56. The second portion 138 has an outer profile of a pinion gear 146, best seen in FIG. 1D, engaging the rack gear portions 92, 94 of the pistons 88, 90.

Figure 1G:
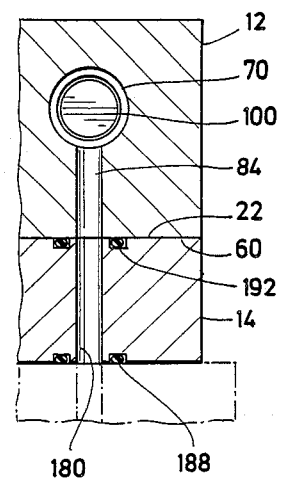
FIG. 1G is a section taken along line 1G—1G of FIG. 1F.
Figure 1F:
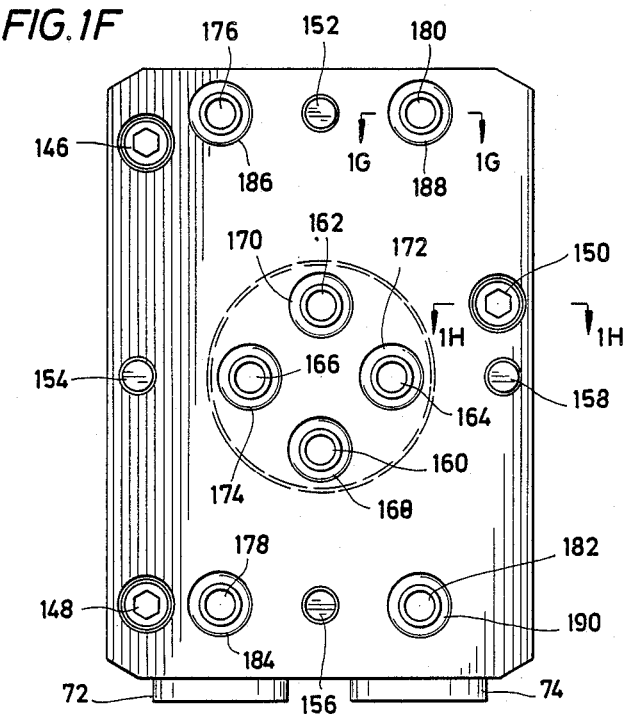
FIG. 1F is a front elevation taken along the line 1F—1F of FIG. 1A.
Figure 1H:
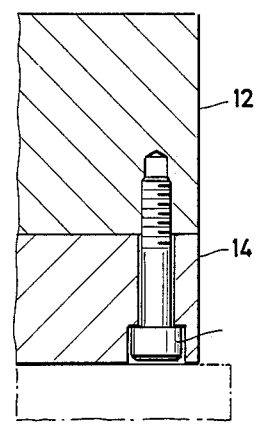
FIG. 1H is a section taken along line 1H—1H of FIG. 1F.

Cap screws 146, 148, 150 secure the body and housing together, as best seen in FIG. 1H. Cap screws 152, 154, 156, 158 are used to mount the valve on the equipment it is to control, shown only in phantom in FIG. 1A, or to secure a cover plate (not shown) to the valve for shipment.

Turning now to FIGS. 1E, 1F and 1G, it will be seen that in this embodiment, the rotor 16 is provided with two pairs of ports 132, 134, each pair of ports connected by a respective conduit 136. The housing, see FIG. 1F, is provided with pressure port 160, return port 162, first cylinder port 164 and second cylinder port 166, each port surrounded by a respective 0-ring 168, 170, 172, 174 to assure a fluid-tight seal with the equipment (not shown). The housing is also supplied with first port 176, second port 178, third port 180 and fourth port 182, each of these ports surrounded by a respective 0-rings 184, 186, 188, 190. Housing ports 176, 178, 180, 182 are aligned, respectively, with ports 80, 82, 84, 86 in the valve body. The details of one of these ports 180 is shown in FIG. 1G, with the port 180 being aligned with port 84 in the body 12. An 0-ring 192 is provided between the face 22 of the housing 14 and the face 60 of the body 12 to assure a tight seal.

It will be appreciated that the first or preferred embodiment of the invention can be used as a four-way valve, as shown diagrammatically in FIG. 1B, with the control being effected by the selective pressurization of ports 176, 178, 180, 182. The normal procedure would be to pressurize the bias or reference port 182 and selectively vent or pressurize at least one of the ports 178, 180 with the pressure differential causing the relative oppositely directed parallel movement of the pistons 88, 90 to cause the relative rotation of the rotor 16 thereby selectively positioning ports 132, 134 opposite pressure 160, return 162, first cylinder 164 and second cylinder 166 ports.

Figure 2A:
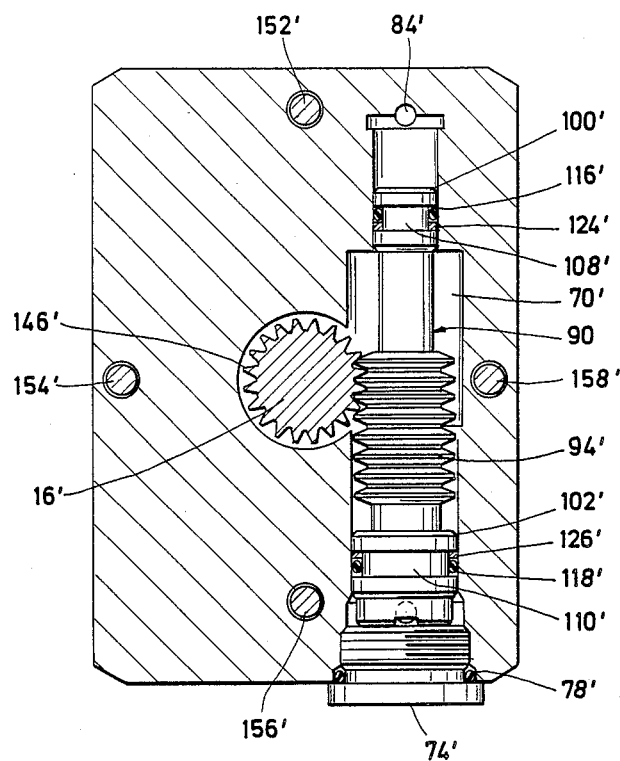
FIG. 2A is a section similar to FIG. 1D showing a second embodiment of a four-way rotary shear seal hydraulic valve according to the present invention.
Figure 2B:
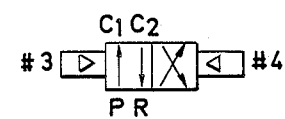
FIG. 2B is a schematic representation of the embodiment of FIG. 2A.
Figure 2C:
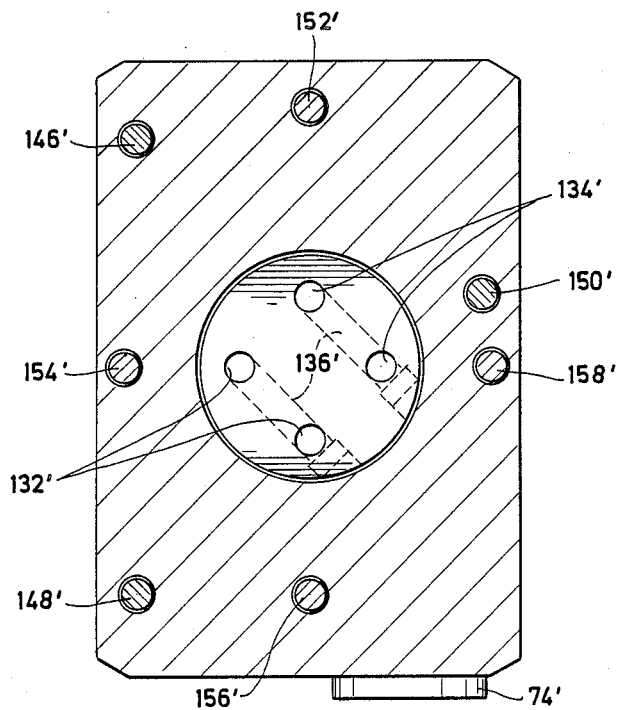
FIG. 2C is a section, similar to FIG. 1E, showing the second embodiment of the present invention.
Figure 3A:
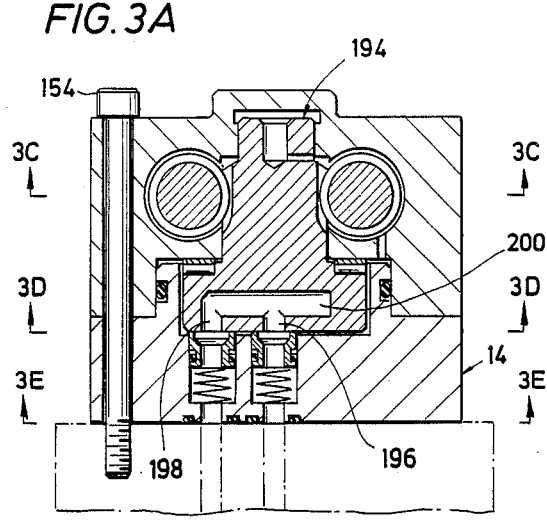
FIG. 3A is a section similar to FIG. 1A showing a three-way rotary shear seal hydraulic valve according to the present invention.
Figure 3B:
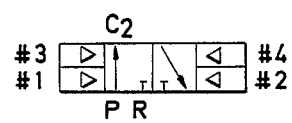
FIG. 3B is a schematic representation of this third embodiment of FIG. 3A.
Figure 3D:
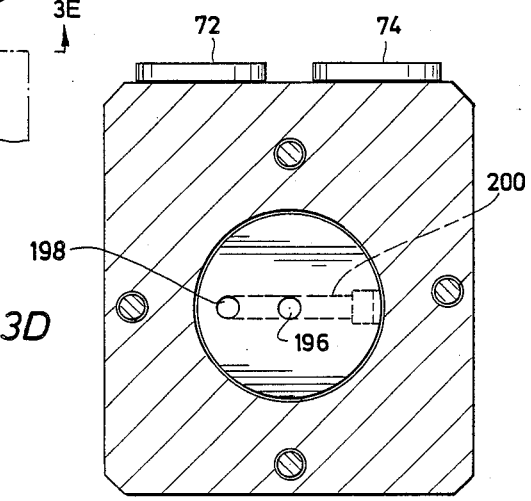
FIG. 3D is a section taken along line 3D—3D of FIG. 3A.
Figure 3C:
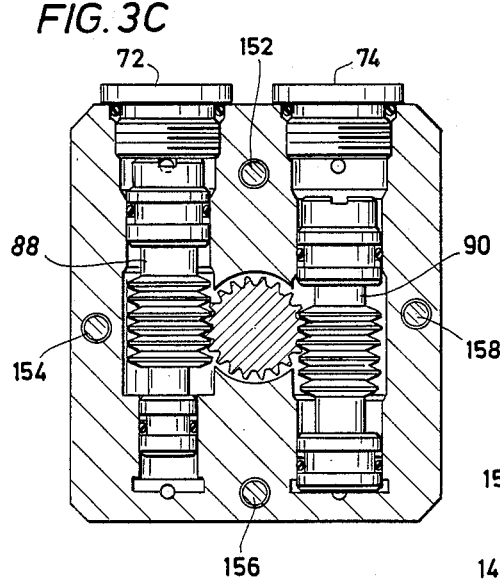
FIG. 3C is a section view taken along line 3C—3C of FIG. 3A.
Figure 3E:
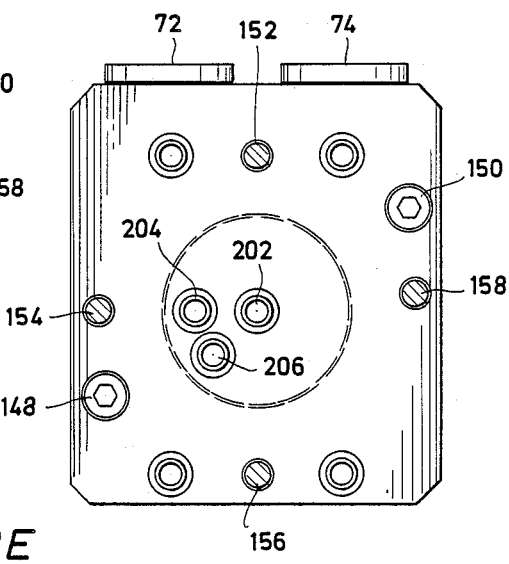
FIG. 3E is an elevation view taken along the line 3E—3E of FIG. 3A.
Figure 6A:
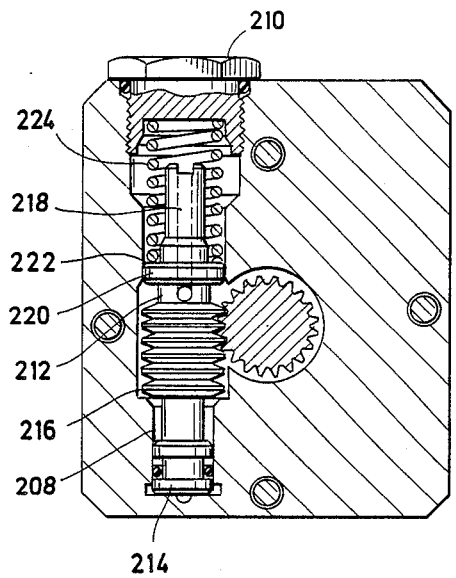
FIG. 6A is a section similar to FIG. 1D showing a normally closed, spring return, three-way rotary shear seal hydraulic valve embodiment of the present invention.
Figure 6B:
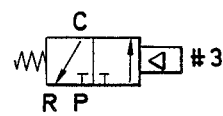
FIG. 6B is a schematic representation of this sixth embodiment.

Turning now to the second embodiment of the present invention which is shown in FIGS. 2A and 2C, this is also a four-way valve and has a single piston 90'. Due to the structural similarity of this second embodiment to the primary embodiment, the parts corresponding to the primary embodiment are shown with the same reference numerals with a prime designation.

It will be noted from the schematic, FIG. 2B, that by application of pressure to the signal port 3 or the reference port 4, the subject valve will be driven to the desired position, thereby effecting a four-way control. This embodiment could be assembled with a body having only one bore 70' and piston 94' or by removing piston 88 and plugging ports 80, 82.

The third embodiment of the present invention is shown in FIGS. 3A-3E. In this embodiment the valve assembly is a three-way valve, as opposed to the four-way valve shown in the first and second embodiments. This embodiment differs from the primary embodiment in the number and the location of the ports in the rotor and in the housing. Therefore, only those portions of this embodiment which differ from the previous embodiments will be referenced, the remaining portions being substantially the same as those previously discussed. In this instance, the rotor 194 has a port 196 centrally located on its rotational axis and a second port 198 located radially outwardly from the central port 196. The ports would be interconnected by an internal conduit 200. The housing 14 would have a rearrangement of the ports with a central port 202 coaxial with the rotational axis of the rotor 194 and ports 204, 206 located radially outwardly therefrom along the circumference of a circle defining the path traveled by the outer port 198 of the rotor 194. This embodiment has a pair of pistons driving the rotor in the manner previously discussed.

The fourth and fifth embodiments of the present invention, FIGS. 4A-4C and 5A-5C, are similar to the third embodiment in that both are three-way rotary shear seal hydraulic valves. The embodiment of FIGS. 4A-4C is a normally open valve and the embodiment of FIGS. 5A-5C is a normally closed valve. The rotors 194' and 194" in these embodiments are substantially identical with rotor 194 shown in the third embodiment. The piston arrangements are substantially identical with either half of the third embodiment, the pistons being arranged to drive the normally open valve (FIG. 4) closed and the normally closed valve (FIG. 5) open. In the third embodiment, the third and fourth ports are blocked internally and are not used, while the in fifth embodiment, the first and second ports are blocked internally and are not required. This can best be appreciated from the schematic drawings FIG. 4B and FIG. 5B.

The sixth and seventh embodiments are shown in FIGS. 6A-6C and FIGS. 7A-7C, respectively. These embodiments differ from the previous third, fourth and fifth three-way valve embodiments in the piston drive portions. Referring to the sixth embodiment, the piston bore 208 is closed at one end by a threaded plug 210 and the piston 212 is movably mounted therein. The piston 212 has a piston head 214 on one end, an intermediate rack gear portion 216 and a profiled end 218 including a peripheral flange 220 defining a shoulder 222 against which one end of a spring 224 rests. The other end of the spring engages the plug 210.

In this embodiment, ports 1, 2 and 4 are blocked or omitted internally and are not required. The valve is shown with a normally closed spring return, note schematic FIG. 6B. In order to actuate the valve, pressure would be applied against the piston head 214 driving it to rotate the rotor in a clockwise direction from the position shown in FIG. 6C to the position shown in FIG. 7C.

Figure 7A:
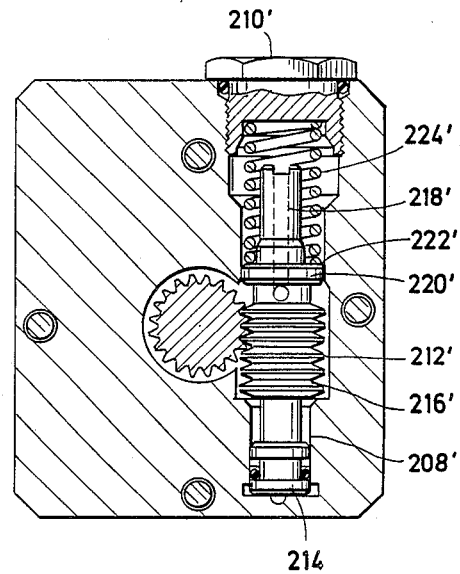
FIG. 7A is a section similar to FIG. 6A showing a normally open, spring return, three-way rotary shear seal hydraulic valve embodiment of the present invention.
Figure 7B:
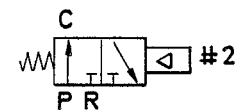
FIG. 7B is a schematic representation of this seventh embodiment.
Figure 6C:
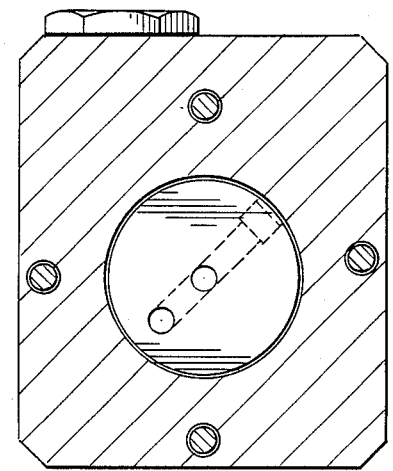
FIG. 6C is a section similar to FIG. 1E showing the sixth embodiment of the present invention.
Figure 7C:
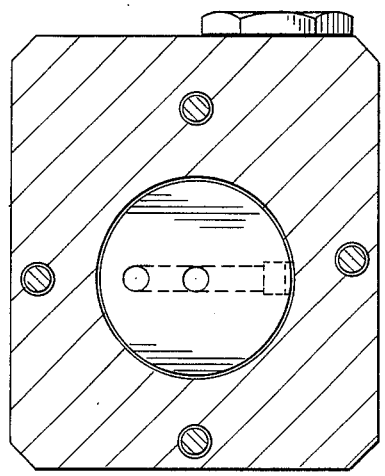
FIG. 7C is a section similar to FIG. 6C showing the seventh embodiment of the present invention.

FIG. 7 shows the alternate to the embodiment of FIG. 6 with the piston located on the opposite side of the body to drive the rotor in a counterclockwise direction. For this embodiment, since the parts are substantially a mirror image with the embodiment of FIG. 6, the same reference numerals are used with a prime designation, the primary difference being that in this embodiment, ports 1, 3 and 4 are blocked or omitted internally and are not utilized, see the schematic FIG. 7B.

Figure 8A:
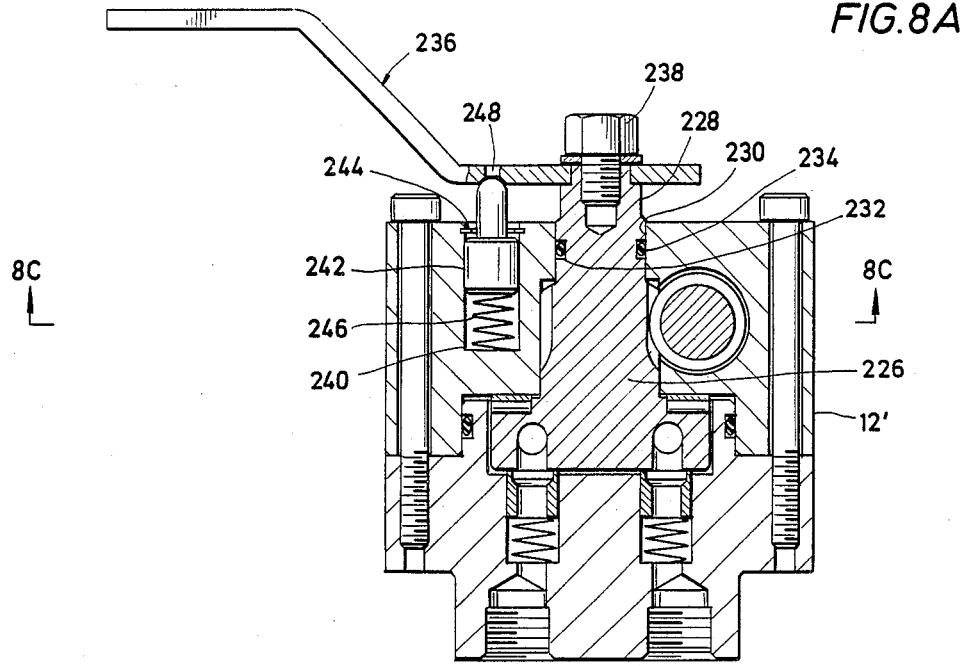
FIG. 8A is a section showing a manual override embodiment of a four-way, three-position rotary shear seal hydraulic valve according to the subject invention.
Figure 8C:
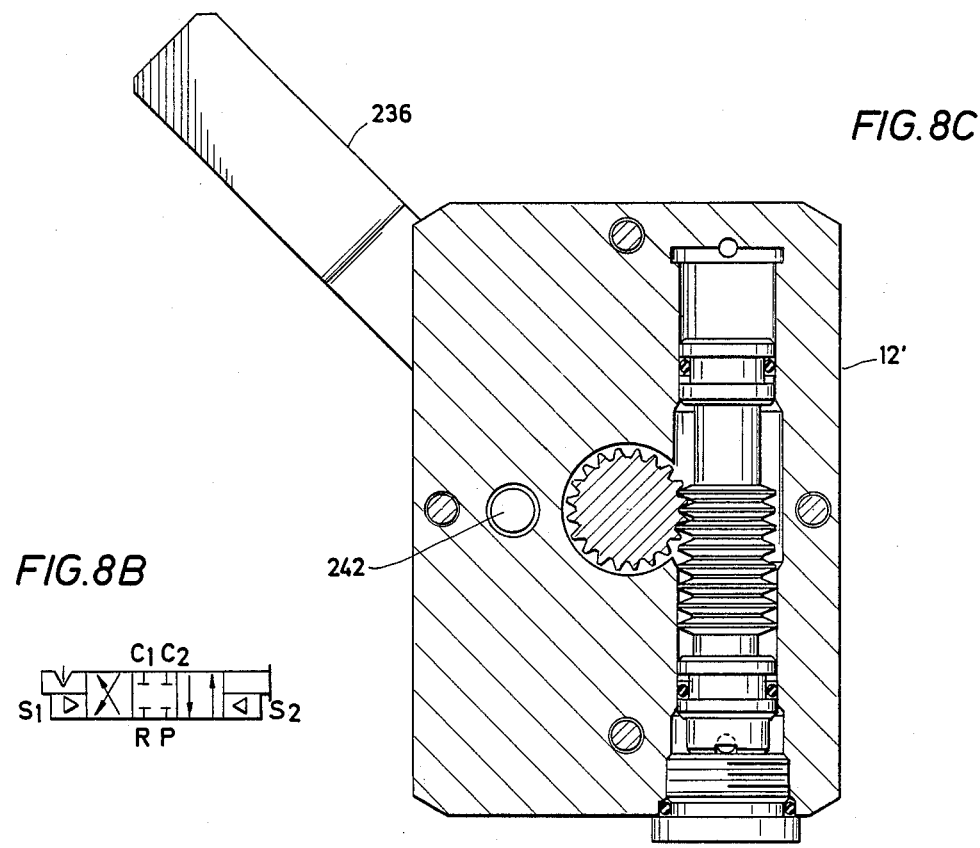
FIG. 8C is a section taken along line 8C—8C of FIG. 8A.
Figure 8B:
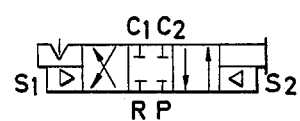
FIG. 8B is a schematic representation of this eighth embodiment.

The embodiment of FIG. 8 is another four-way rotary shear hydraulic valve similar to the embodiment of FIG. 2. This embodiment is provided with a manual override, see schematic FIG. 8B, and therefore only those portions of the embodiment which are distinct from the previous four-way valve embodiment will be described in detail. In this embodiment, the rotor 226 has an extended portion 228 which passes through an aperture 230 in the rear wall of the body 12'. The portion 228 is provided with an outwardly directed groove 232 which receives an 0-ring 234 therein to seal aperture 230. A lever 236 is mounted on the free end of the portion 228 by means of a bolt 238. Preferably, there would be some profiling of portion 228 to assure a non-rotational engagement between the lever and the rotor. The body 12' also has a rearwardly directed bore 240 containing a spring loaded detent 242 which is retained in the bore by a clip 244. The detent is biased against the retaining ring 244 by spring 246. The lever 236 has a hole 248 positioned to receive the tip of the detent 242. Detent 242 will only engage hole 248 when the handle 236 is in the center position.

The operation of this embodiment should be readily apparent in that the lever is moved to the desired position to interconnect the ports as desired by appropriately positioning the rotor. The detent engages and prevents further movement of the lever which in turn prevents further rotation of the rotor. While only one detent has been shown, clearly any number of detents could be provided to achieve the desired control.

Figure 9D:
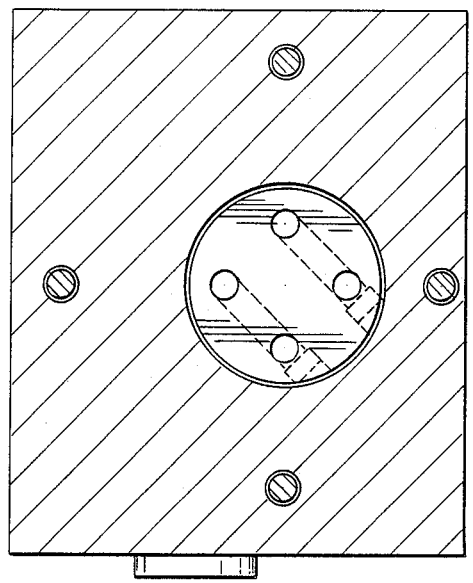
FIG. 9D is a section taken along line 9D—9D of FIG. 9A.
Figure 9E:
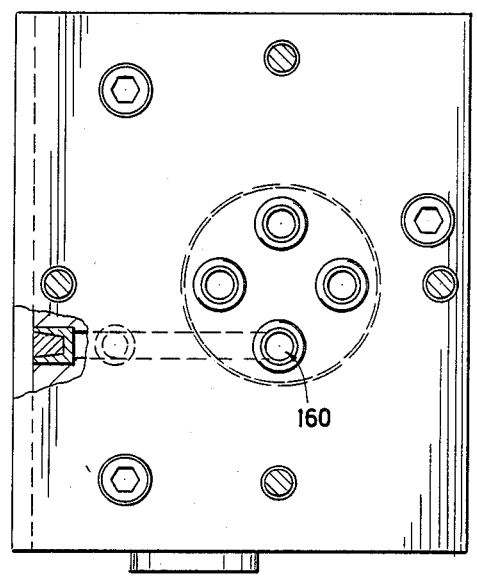
FIG. 9E is an elevation taken along line 9E—9E of FIG. 9A.
Figure 9F:
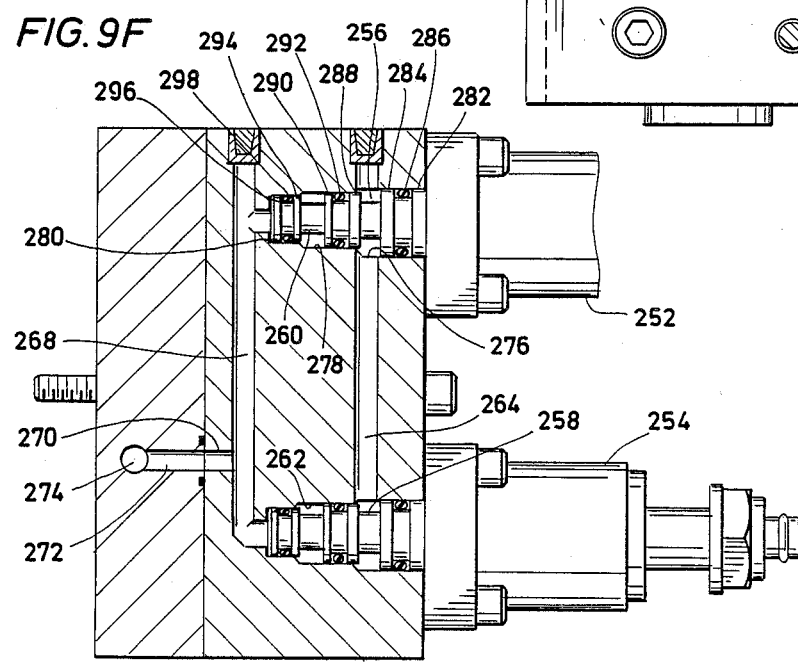
FIG. 9F is a section taken along line 9F—9F of FIG. 9C.

FIGS. 9A-9F show an embodiment of the present invention which is a four-way rotary shear hydraulic valve with solenoid pilot valves controlling the actuation of the pistons. In this embodiment, the housing 10 and rotor 16 are substantially identical with the previous embodiments. The body 250 differs, however, in the ways discussed below. A pair of solenoids 252, 254 are mounted on the body with respective valve assemblies 256, 258 extending into respective bores 260, 262. The bores are interconnected by internal conduits 264, 268 with the conduit 268 in turn connected to a port 270 which leads to a port 272 and conduit 274 in the housing leading to the pressure port 160. Each of the two bores 260, 262 has a stepped profile starting with an enlarged first portion 276 and intermediate portion 278 and a neck portion 280. The valve assemblies 256, 258 are formed by a first and largest valve portion comprising first and second spaced flanges 282, 284 with an 0-ring 286 therebetween. The second and intermediate valve has first and second flanges 288, 290 with an 0-ring 292 therebetween. The third and smallest valve has a pair of spaced flanges 294, 296 with an 0-ring 298 therebetween. Referring to FIG. 9C, it should be noted that bores 300, 302 connect the respective bores 260, 262 to opposite ends of the bore 68 carrying the piston 88 therein.

It will be best appreciated from the schematic diagram of FIG. 9B how this embodiment operates. Energization of either of the solenoids 252, 254 will cause the respective valve assembly to be opened connecting the pressure port 160 to that end of the bore 68 to drive the piston 88 and thereby rotor 16 in the opening or closing direction.

From the foregoing, it will be appreciated that, with a limited number of standardized parts, the present invention can be assembled to fashion a wide variety of three-way and four-way rotary shear seal hydraulic valves. This provides for ease of repair as well as reduction in parts inventory and storage.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A rotary shear seal hydraulic comprising:
   a valve housing and valve body, together defining a generally cylindrical cavity with a stepped profile;
   first and second passages in said valve body intersecting said cavity along a chord thereof, a port opening into each end of each of said first and second passages;
   at least two bores in said valve housing intersecting said cavity parallel to the axis thereof and with at least one bore situated on a curve concentric with said axis;
   a profiled rotor received in said cavity, said rotor having an axial face with at least two ports therein, conduits within said rotor connecting said ports in pairs, said ports being spaced to align respectively with said bores upon proper rotational positioning of said rotor, said rotor having a portion profiled to define a pinion;
   first and second pistons mounted in said first and second passages, respectively, each said piston having a portion defining a rack engaging said pinion portion of said rotor;
   means connected to each of the said ports opening into each end of said first and second passages to fluid drive each of the said pistons in said first and second passages in opposite directions, each of said ports being hydraulically independent of each other; and
   a shear seal assembly in each said at least two bores, each said shear seal assembly having an annular seal body mounted in a respective bore and a spring biasing said seal body into engagement with said axial face of said rotor, and annular seal means forming a wiping seal with walls of said bore.

2. A rotary shear seal hydraulic valve according to claim 1 further comprising sealing means between said valve body and said valve housing sealing said cavity.

3. A rotary shear seal hydraulic valve according to claim 1 wherein said body has a profiled recess and said housing has a profiled flange received in said recess, and sealing means on said flange whereby said housing and said body are sealed together.

4. A rotary shear seal hydraulic valve according to claim 1 further comprising thrust bearing assembly mounted between said rotor and said valve body, said thrust bearing assembly comprising a thrust race mounted against said body and a plurality of thrust needle bearings engaging said rotor and said thrust race.

5. A rotary shear seal hydraulic valve according to claim 1 further comprising means to mount said valve on an assembly.

6. A rotary shear seal hydraulic valve according to claim 1 wherein said valve is a three-way valve.

7. A rotary shear seal hydraulic valve according to claim 1 wherein said valve is a four-way valve.

8. A rotary shear seal hydraulic valve according to claim 1 wherein said housing has a rearwardly directed recess surrounded by a flange received in a recess in said body forming a larger first portion of said cavity.

9. A rotary shear seal hydraulic valve according to claim 1 wherein said valve is a three-way valve with only two connected ports in said rotor and three bores in said valve housing, one coaxial with the rotor and the other two on a curve concentric with the rotor axis.

* * * * *